UNITED STATES PATENT OFFICE.

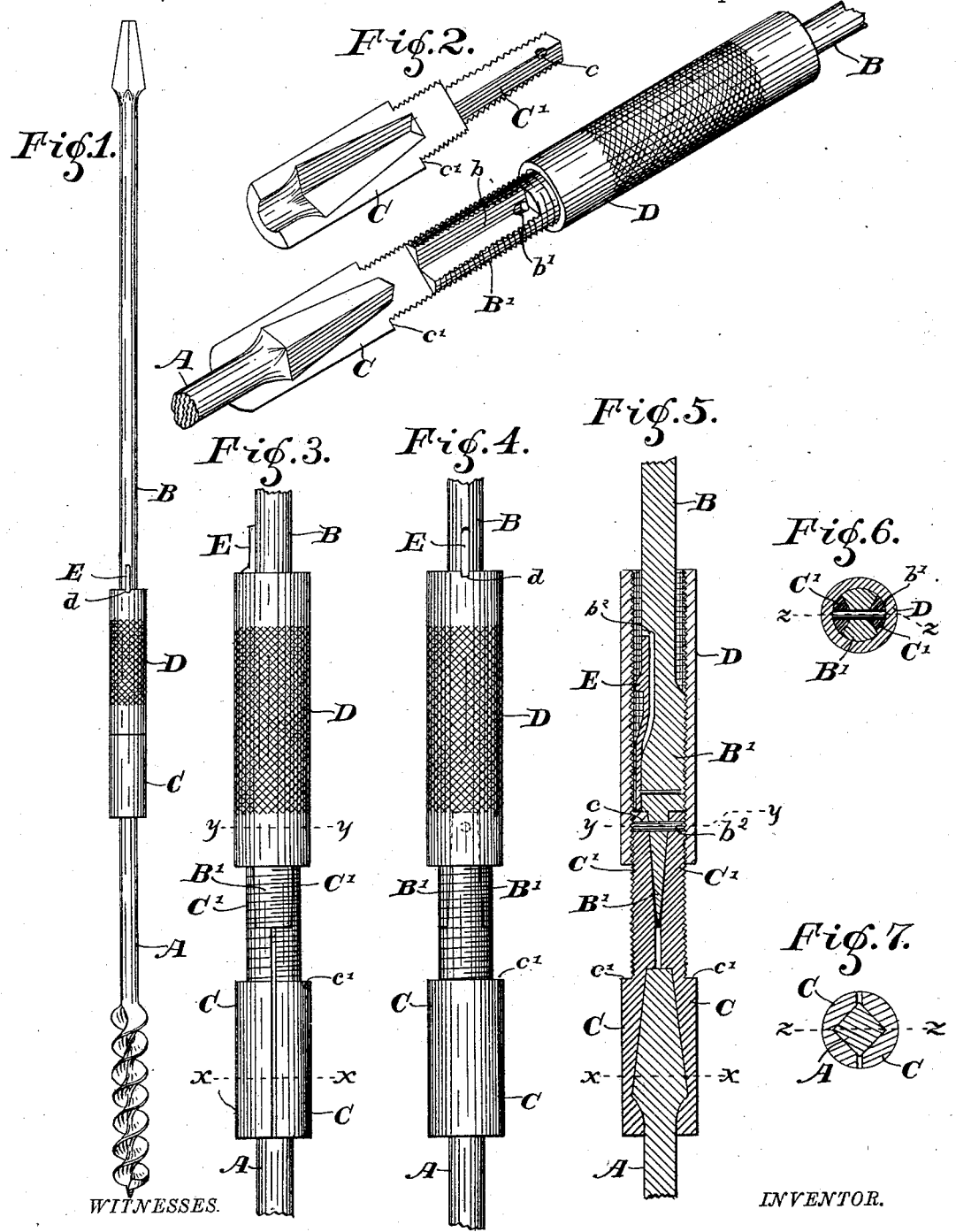

ISAAC P. SHOTTS, OF LINDEN, INDIANA.

EXTENSION-SHANK FOR BITS, &c.

SPECIFICATION forming part of Letters Patent No. 315,079, dated April 7, 1885.

Application filed February 7, 1885. (No model.)

*To all whom it may concern:*

Be it known that I, ISAAC P. SHOTTS, of the town of Linden, county of Montgomery, and State of Indiana, have invented certain new and useful Improvements in Extension-Shanks for Bits, &c., of which the following is a specification.

The object of my said invention is to provide a handy and efficient splice or extension for bits, which can be easily and rigidly secured to the shank of any ordinary bit, whereby the length of said bit can be extended when desired, as will be hereinafter more particularly set forth.

Referring to the accompanying drawings, which are made a part hereof, and on which similar letters of reference indicate similar parts, Figure 1 is a side elevation of a bit having one of my extensions secured thereon; Fig. 2, a perspective view of the chuck on the lower end of said extension, by which it is secured to the bit, one jaw of which is shown separate therefrom to show the formation of the interior; Fig. 3, an elevation of that part shown in Fig. 2, showing the edge of the jaws, the nut being turned nearly off of the shanks of said jaws; Fig. 4, a view similar to Fig. 3, showing the side of said jaw; Fig. 5, a central vertical section on the dotted line $z\,z$ in Fig. 4; Fig. 6, a cross-section on the dotted line $y\,y$, and Fig. 7 a cross-section on the dotted line $x\,x$.

In said drawings the portions marked A represent the bit; B, the shank of the extension; C, the jaws of the chuck thereof; D, the nut, and E a spring-catch for holding said nut in position.

The bit A is of any ordinary construction, having the end of the shank formed square and tapering in the usual manner. The shank of the extension is for the most part of a similar construction to the ordinary bit-shank, and is or may be of various lengths to suit the variety of uses to which it may be put. An enlarged portion, E', is formed on its lower end, on which the nut D operates, threads being cut thereon for this purpose. Notches $b$ are formed in opposite sides of the lower end of this enlarged portion, extending up a short distance longitudinally thereof, said notches being formed to receive the shanks of the jaws C, and a pin, $b'$, is inserted transversely through said lower end, the ends of which project into said notches near their upper ends, on which the shanks of the jaws C are mounted, as will be presently described. The jaws C are of a semi-cylindrical form, having their interior notched out at their outer ends to receive the end of the bit-shank, as shown. They are provided on their upper ends with shanks C', which are formed to fit into the longitudinal notches $b$ in the lower end of the extension. Transverse holes $c$ are provided in the ends of said shanks, which fit onto the projecting ends of the pin $b'$, and thus hold the jaws in place. These shanks are preferably screw-threaded on their outside to correspond with the threads on the lower part of the shank in which they are mounted. The threaded portion also extends down onto the main part of the jaws for a short distance to the shoulder $c'$, against which the end of the nut abuts, said jaws being enlarged at this point to preferably the same size as said nut D, thus giving the exterior of the chuck a smooth finish. The nut D is a common cylindrical nut of a length convenient to be turned by the hand, and sufficient to surround all the parts and hold them securely in place. Its exterior is of any appropriate form to afford a good hold for the hand, and is preferably milled, as is usual, to afford a better grip for the hand. A notch or notches, $d$, are formed in the upper edge of said nut, with which the spring-catch engages, and thus holds said nut in position when screwed down.

The spring-catch E is or may be of any suitable construction, the one shown being an ordinary spring secured at one end in a groove in the top of the part B' by a bolt or rivet, $e$, the catch being formed on its top at the appropriate place to engage with one of the notches in the end of the nut when said nut is secured down in closed position. The end preferably extends beyond the catch a short distance to form a thumb-piece, by which said catch can be disengaged when it is desired to turn the nut back and loosen the jaws of the chuck.

When it is desired to use a bit in places where the ordinary bit is of insufficient length, as is frequently the case—notably in bridge-building, ship-building, &c.—one of my improved extensions may be secured to said ordinary bit in the following manner: The several parts of the chuck of said extension being in closed position, the nut D is turned back a short distance to allow the jaws to be spread apart and the end of the bit-shank to be inserted between them. Said nut is then turned down, which operates to draw the jaws together and clamp them rigidly upon said bit-shank, as will be readily understood. When the nut is turned down into the position shown in Fig. 1, the spring-catch E is released, and at once springs up into engagement with one of the notches in the end of said nut, and thus prevents it from turning back, thereby insuring against any of the parts becoming loose while in use. The two parts are thus easily and quickly secured together, and a splice formed which is smooth and neat, and will readily pass through the hole made by the bit.

Having thus fully described my said invention, what I claim as new, and desire to secure by Letters Patent, is—

1. An extension-shank for bits, having a chuck formed on its lower end, said chuck consisting of two or more jaws having shanks on their inner ends, which fit into longitudinal notches in the lower end of the shank of the extension, the lower end of said jaws being enlarged, and a shoulder, $c'$, being formed a short distance above their lower ends, and a nut adapted to screw down onto said lower end of said extension around said jaws against said shoulder, substantially as set forth.

2. The combination, with the shank B of a bit-shank extension, of the enlarged portion B', having longitudinal notches $b$, the jaws C, provided with shanks C', said shanks C' being mounted in the notches $b$ of the part B', and the nut D, the interior of which is screw-threaded, and is adapted to screw down onto said part B' and around said jaws, substantially as set forth.

3. The combination of the shank B, having an enlarged portion, B', said enlarged portion being provided with longitudinal notches $b$, the transverse pin $b'$, the ends of which project into said notches, the jaws C, having shanks C', said shanks being provided with transverse holes through which the ends of said pin $b'$ are inserted, and the nut D, the interior of which is screw-threaded and adapted to screw down onto the portion B' and around the shank and upper portion of the jaws C, the exterior of which are formed screw-threaded, substantially as set forth.

4. The combination of the shank B, having an enlarged portion, B', said enlarged portion being screw-threaded, and provided with longitudinal notches $b$ therein, the jaws C, formed with shanks C', which enter said longitudinal notches, said jaws being provided with a shoulder, $c'$, a short distance from the lower end of the shank, the part of said jaw above said shoulder being of the same size as the portion B' of the shank B, and screw-threaded, and the nut D, said nut D being internally screw-threaded and adapted to screw down onto the part B' and surround a portion of the jaws C, whereby said jaws are easily clamped upon the end of a bit-shank, substantially as set forth.

5. The combination, with the shank B, jaws C and nut D, said nut being provided with notches $d$ in its outer end, of the spring E, secured in a groove in the part D, the catch of which is located at the end of said nut, whereby it engages with said notches and holds said nut in position, substantially as set forth.

In witness whereof I have hereunto set my hand and seal at Indianapolis, Indiana, this 30th day of January, A. D. 1885.

ISAAC P. SHOTTS. [L. S.]

In presence of—
E. W. BRADFORD,
CHAS. L. THURBER.